US012768672B2

(12) United States Patent
Bellows

(10) Patent No.: US 12,768,672 B2
(45) Date of Patent: Oct. 20, 2026

(54) SYSTEM AND METHOD FOR DETECTING OPENING EVENTS OF AN ITEM

(71) Applicant: Zebra Technologies Corporation, Lincolnshire, IL (US)

(72) Inventor: David Bellows, Fort Salonga, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/990,687

(22) Filed: Dec. 20, 2024

(65) Prior Publication Data

US 2026/0177405 A1    Jun. 25, 2026

(51) Int. Cl.

*G01D 5/14* (2006.01)
*G06K 7/10* (2006.01)
*G06K 19/07* (2006.01)

(52) U.S. Cl.

CPC ........... *G01D 5/14* (2013.01); *G06K 7/10297* (2013.01); *G06K 19/0701* (2013.01)

(58) Field of Classification Search

CPC ... G01D 5/14; G06K 7/10297; G06K 19/0701
USPC ........................................................ 235/451
See application file for complete search history.

(56) References Cited

U.S. PATENT DOCUMENTS

| | | | | |
|---|---|---|---|---|
| 5,828,157 A * | 10/1998 | Miki | H10N 30/2042 | |
| | | | 310/321 | |
| 2008/0317479 A1* | 12/2008 | Kadowaki | G03G 15/556 | |
| | | | 399/12 | |
| 2018/0329496 A1* | 11/2018 | Hattori | B60K 35/25 | |
| 2021/0084390 A1* | 3/2021 | German | H04Q 9/00 | |
| 2025/0065334 A1* | 2/2025 | Fichter | B01L 7/50 | |

* cited by examiner

*Primary Examiner* — Ahshik Kim

(57) ABSTRACT

An example assembly for detecting opening events of an item includes: a wireless communications tag. A memory of the wireless communications tag is configured to store an opening indicator. A piezoelectric element is configured to be disposed between two mating portions of a closing structure of the item. The piezoelectric element is loaded when the two portions are mated and unloaded when the two portions of the closing structure are unmated. The piezoelectric element is configured to output an electric signal that can be used by the wireless communications tag, e.g., to cause a logic circuit of the wireless communications tag to update the opening indicator when the piezoelectric element is unloaded.

21 Claims, 4 Drawing Sheets

SYSTEM AND METHOD FOR DETECTING OPENING EVENTS OF AN ITEM

BACKGROUND

Items such as products or goods for sale, or food, drink or medication for consumption may be stored in packages having closing structures to secure their contents. However, malicious entities may open and tamper with the items, resulting in improper transactions or handling of consumable items.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
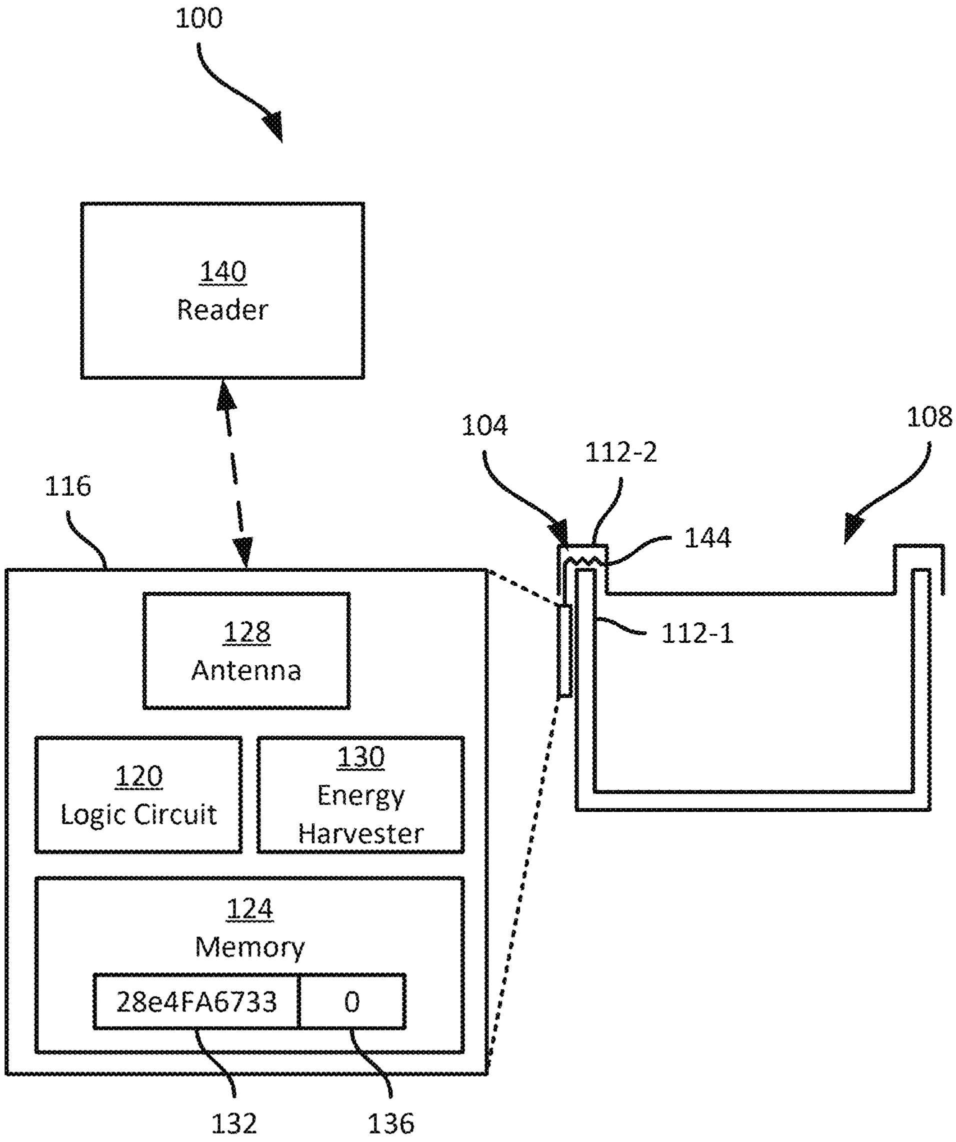
FIG. 1 is a schematic diagram of a system for detecting opening events of an item.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an assembly for detecting opening events of an item, the assembly comprising: a wireless communications tag comprising: a logic circuit and a memory configured to store an opening indicator; and a piezoelectric element operatively coupled to the logic circuit, the piezoelectric element is configured to be disposed between two mating portions of a closing structure of the item; wherein the piezoelectric element is loaded when the two portions are mated and unloaded when the two portions of the closing structure are unmated; and wherein the piezoelectric element is configured to output an electric signal to cause the logic circuit to update the opening indicator when the piezoelectric element is unloaded.

Additional examples disclosed herein are directed to a method comprising: initializing an assembly for detecting opening events of an item by disposing a piezoelectric element of the assembly between two mating portions of a closing structure of the item to load the piezoelectric element; generating and outputting, by the piezoelectric element, an electric signal in response to unloading the piezoelectric element by unmating the two portions of the closing structure; and updating an opening indicator stored in the wireless communications tag in response to the generating and outputting of the electric signal by the piezoelectric element.

Additional examples disclosed herein are directed to a system comprising: a wireless communications tag, the wireless communications tag being affixed to an item, the wireless communications tag including or being operatively coupled to a piezoelectric element disposed between two mating portions of a closing structure of the item, the wireless communications tag configured to store an opening indicator based on an electrical signal output by the piezoelectric element, the opening indicator indicates whether the two mating portions were unmated or a number of times the two mating portions were unmated; and a reader configured to interrogate the wireless communications tag, wherein in response to interrogation of the wireless communications tag by the reader, the wireless communications tag transmits a value of the opening indicator to the reader.

FIG. 1 depicts a system 100 for detecting opening events or occurrences of items in accordance with the teachings of this disclosure. The system 100 includes a detection assembly 104 configured to detect opening occurrences of an item 108. The item 108 includes two mating surfaces or portions 112-1 and 112-2 (referred to herein generically as a portion 112 and collectively as the portions 112; this nomenclature may also be used elsewhere herein) forming a closing structure of the item 108. In the present example, the item 108 is a container having a base and a lid. A rim of the base forms the first portion 112-1 and a groove of the lid forms the second portion 112-2. The portions 112 may mate by friction fit to securely close the container to secure the contents of the item 108. In other examples, other closing structures with different types of mating portions 112 are also contemplated. For example, the closing structure may include other types of snap- or friction-fitting portions 112, complementary threaded portions 112, or the like. Portions 112 may also be fastened together, for example, with hardware, such as nails, screws, staples, rivets, etc., and/or using an adhesive.

The item 108 may contain products or goods for sale or distribution, for example in a retail or transport and logistics facility, or sensitive and/or protected products, such as medication, food or drink for consumption or the like, and hence it may be practical to track opening occurrences of the item 108. For example, tracking opening occurrences may facilitate identification of tampering of the products or goods for sale or distribution to guard against theft, product-switching, and the like. Retailers, for example, may wish to know if the item's package has been opened prior to a customer checking out in order to combat fraudulent activities, such as when the contents of an inexpensive product are removed from the packaging and are replaced with a high value item (i.e., product-switching). This effectively disguises the high value item in packaging intended for a low-priced item. Furthermore, to mitigate against return fraud, retailers may also wish to identify whether an item has been opened after it is sold, as a number of merchandise categories, such as electronics, may not be returned if the package has been opened.

In another example, a company may wish to know if a product's enclosure has been opened, thereby voiding the product's warranty. This could range from small electronic devices to large appliances. In yet another example, in a manufacturing environment, a supervisor may need to know if certain components of a piece of equipment have been opened up, which could impact a number of issues including operator safety and machine service.

Tracking opening occurrences may also facilitate identification of tampering of items for consumption. For example, for health and safety reasons, it may be important to know whether the packaging for medications and vaccines has been opened, and therefore potentially compromised, after leaving the manufacturing site and before arriving at the pharmacy or medical facility. In addition, tracking opening occurrences may facilitate tracking dosage occurrences of medications or the like. Similarly, food safety and traceability measures chart the journey of numerous grocery categories, such as fresh produce, perishables, refrigerated foods, and frozen items in order to minimize any contamination and to prevent health hazards and recalls for grocery store deliveries, quick serve restaurants, entertainment venues, catering halls, hotels, and similar. Being able to easily detect tampering of bulk food packaging would make these monitoring efforts more valuable and comprehensive.

In particular, the detection assembly 104 may be applied to the item 108 to detect the opening occurrences of the item 108. The detection assembly 104 includes a wireless or radiofrequency (RF) communications tag 116 having a logic circuit 120 interconnected with a memory 124, an antenna 128 and an energy harvester 130. The components of the wireless communications tag 116 may be implemented as one or more integrated and/or discrete circuits. The wireless communications tag 116 is configured to function as an electronic tag for the item 108, for example to identify the item 108 via an electronic product code (EPC) or the like. The wireless communications tag 116 is additionally configured for wireless communications, such as suitable near-field communications, radio-frequency identification (RFID) communications, or the like to allow the electronically stored tag identifiers to be read for identification of the item 108. As a non-limiting example, the wireless communication tag 116 can be configured according to one or more proprietary schemes and/or according to one or more standards, such as ISO 18000-6A, ISO 18000-6B, ISO 18000-6C, ISO/IEC 29143, and/or other standards.

The logic circuit 120 may be a microchip or integrated circuit (IC) or the like, and may include and/or be integrated with the memory 124, or may be independent of the memory 124.

The memory 124 is a non-transitory computer-readable medium that may include volatile (e.g., random access memory (RAM)) and/or non-volatile memory (e.g., read-only memory (ROM), electrically erasable programmable read-only memory (EEPROM), etc.). The memory 124 may store data, including an identifier 132 such as an electronic product code (EPC) or other identifier to identify the item 108. The memory 124 further stores an opening indicator 136 configured to track opening occurrences of the item 108. The opening indicator 136 may be a binary flag, for example to track a binary determination as to whether the item 108 has been opened. In other examples, the opening indicator 136 may be a counter configured to track a number of times the item 108 has been opened. In some examples, the opening indicator 136 may be integrated with the identifier 132 (e.g., as a field of the EPC or the like). Further, in some examples, the memory 124 may additionally store metadata associated with the opening indicator 136, such as a date and/or time of update and/or opening occurrence(s) or the like.

The antenna 128 is configured to send and/or receive signals for wireless communications, for example from and/or to a reader 140, such as an RFID reader or an NFC reader. In particular, the reader 140 may be configured to read and/or request the values of the identifier 132 and the opening indicator 136, for example during a scanning or interrogating operation, via the antenna 128. The antenna 128 may be connected to and controlled by the logic circuit 120.

The detection assembly 104 further includes a piezoelectric element 144. The piezoelectric element 144 can be included in the wireless communication tag 116 or can be an operatively coupled to the wireless communication tag 116. For embodiments in which the piezoelectric element 144 is operatively coupled to the wireless communication tag 116, the piezoelectric element 114 can be disposed between the two mating portions 112 of the item 108, while the wireless communication tag 116 can be positioned on another part of the item 108 (e.g., not between the portions 112) or can also be disposed between the portions 112. For embodiments in which the piezoelectric element is included in the wireless communication tag 116, at least a portion of the wireless communication tag 116 that includes the piezoelectric element 144 can be disposed between the portions 112. The piezoelectric element 144 is configured to convert changes in pressure, strain, force, or the like into an electrical signal. In particular, a pressure, strain or force may be applied to the piezoelectric element 144 by the two mating portions 112 when the portions 112 are mated (e.g., in a closed position to close the item 108). That is, the mating of the portions 112 may load the piezoelectric element 144. When the portions 112 are unmated, for example due to the item 108 being opened, the pressure, strain or force is relieved from the piezoelectric element 144, thereby causing the piezoelectric element 144 to generate an electric signal. That is, the piezoelectric element 144 is unloaded when the portions 112 are unmated. It should be noted that the geometry of portions 112 are exemplary only. In any embodiment, the overlap of portions 112 and their contact area to the piezoelectric element 144 will be sufficient to load the piezoelectric element 144 when the portions 112 are mated. Furthermore, in alternate embodiments, there may be multiple piezoelectric elements 144 which in total may generate a stronger electric signal.

The energy harvester 130 of the wireless communication tag 116 can harvest or generate power from the electrical signal output by the piezoelectric element 144 when the piezoelectric element 144 is unloaded. The power can be used to power the wireless communication tag 116 so that the logic circuit 120 and/or memory 124 are operational. As an example, the wireless communication tag 116 can be a passive tag that does not include a power source. Rather, the wireless communication tag 116 can be configured to harvest power from RF waves using the antenna 128 and/or via the piezoelectric element 144. The electrical signal can also be used by the logic circuit 120 of the wireless communication tag 116 to indicate that the portions 112 have been un-mated, and therefore, indicate an opening occurrence of the item 108. In some examples, the power harvested or generated by the wireless communication tag 116 can be sufficient to allow the wireless communication tag 116 to output a RF signal via the antenna 128. The RF signal can include, for example, information about the item, e.g., including an indication of an opening occurrence of the item 108 and/or a count of opening occurrences. While an example embodiment of the wireless communication tag 116 can be a passive tag that includes an energy harvester 130, embodiments of the wireless communication tag 116 can be an active tag that includes a power source, e.g., a battery, and can be devoid of the energy harvester 130.

Figure 4:
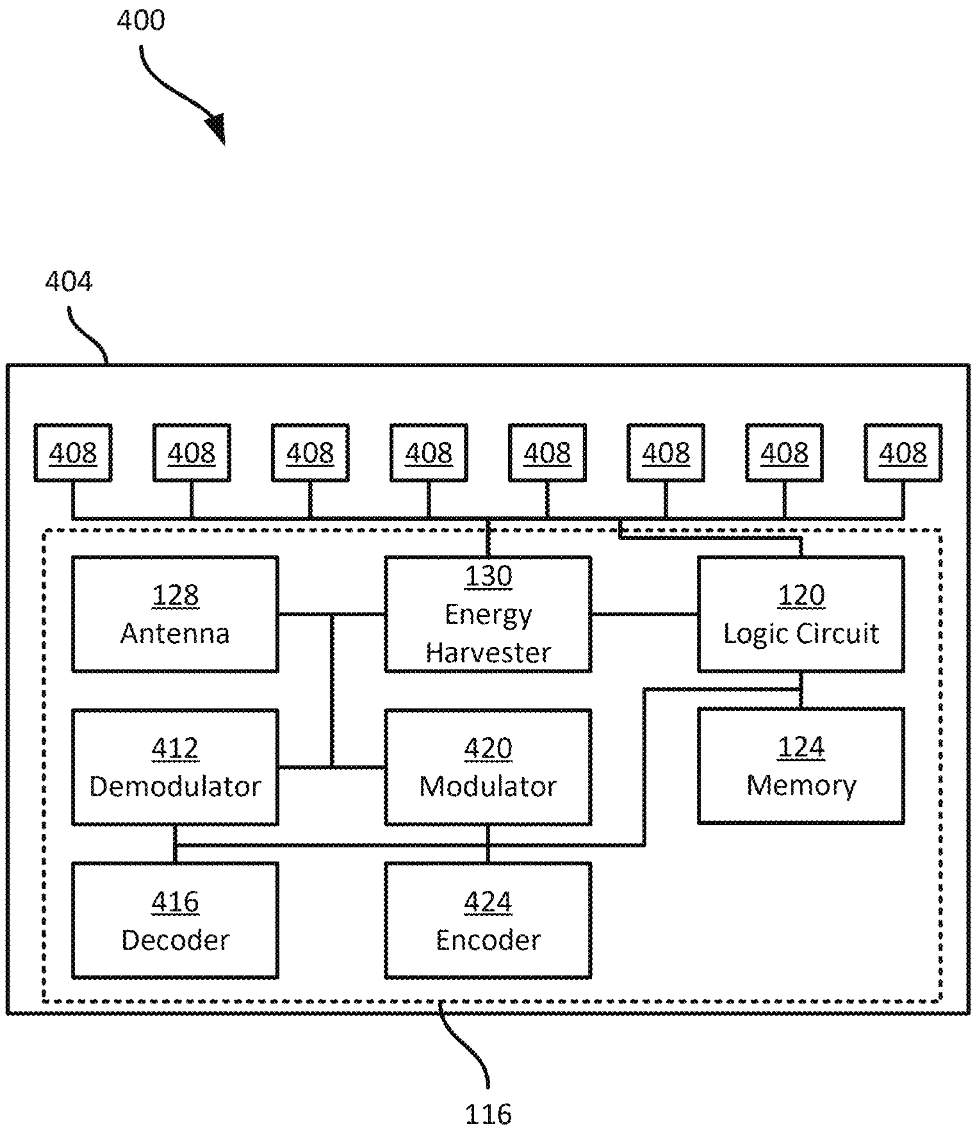
FIG. 4 is a block diagram of another example detection assembly.

As described herein, while the piezoelectric element 144 is illustrated in FIG. 1 as being distal from the wireless communications tag 116, and connected to the wireless communications tag 116 by suitable traces or other electrical connections to communicate the electrical signal generated by the loading and/or unloading of the piezoelectric element 144, the piezoelectric element 144 may be integrated into the wireless communications tag 116, and may be supported on or within a body of the wireless communications tag 116 as shown in FIG. 4.

In FIG. 4, an example detection assembly 400 is depicted. The detection assembly 400 includes a tag body 404 which supports the components of the wireless communications tag 116 as well as piezoelectric elements 408. In particular, the tag body 404 supports the logic circuit 120, the memory 124, the antenna 128 and the energy harvester 130. In particular, the tag body 404 may support an array of piezoelectric elements 408. The portion of the tag body 404 which supports the array of piezoelectric elements 408 may be configured to be disposed between the mating portions 112 of the item 108 to load the piezoelectric elements 408. In the present example, eight piezoelectric elements 408 are depicted; in other examples, more or fewer piezoelectric elements 408 may be included, for example based on an amount of harvestable power which can be harvested by the energy harvester 130 and an amount of power required to energize the logic circuit 120 and the memory 124 to update the memory 124 to track an opening occurrence of the item 108.

Figure 2:
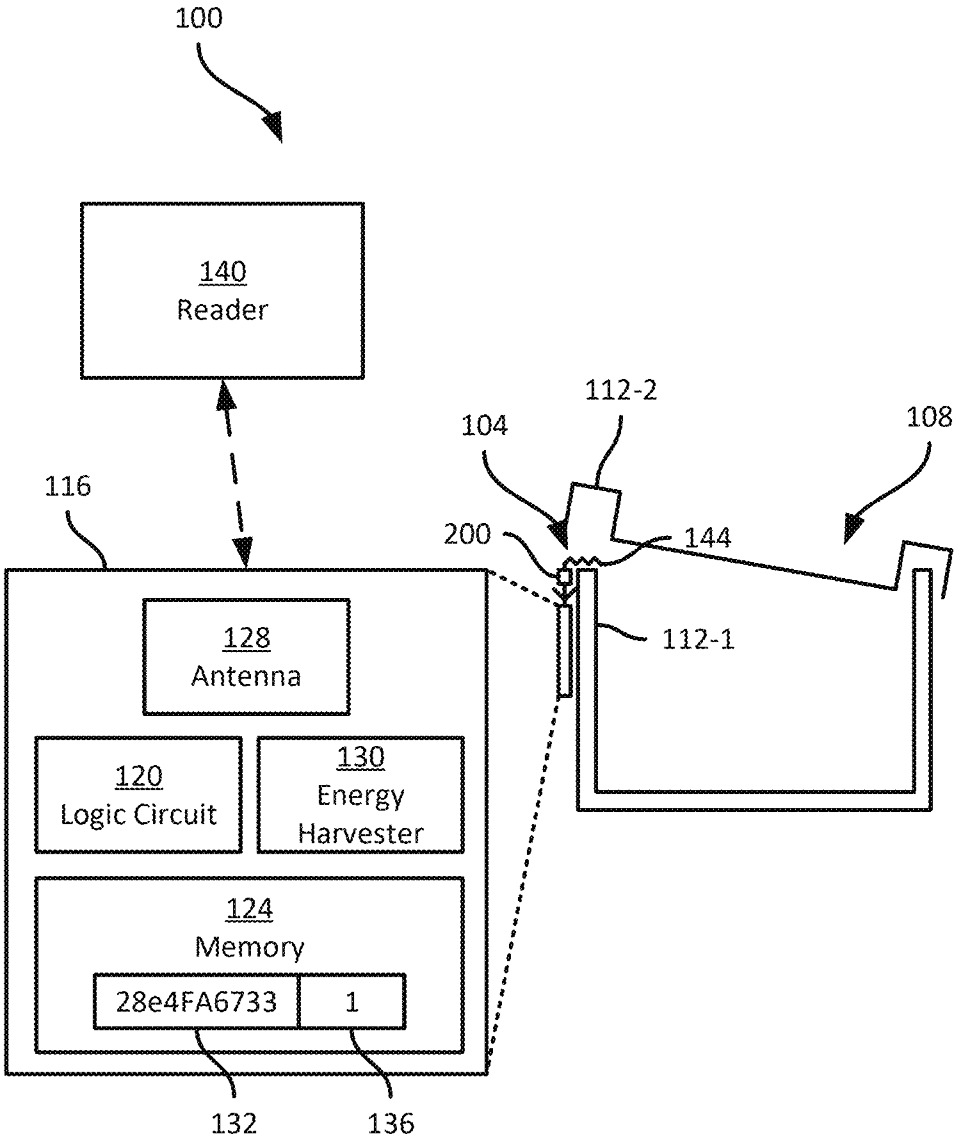
FIG. 2 is a schematic diagram of the system of FIG. 1 when the item is opened.

Referring to FIG. 2, the system 100 is depicted when the item 108 has been opened. In particular, the portions 112-1 and 112-2 are unmated, thereby unloading the piezoelectric element 144. In response to the relief of pressure on the piezoelectric element 144, the piezoelectric element 144 is configured to generate an electric signal 200 and output the electric signal which can be used by the wireless communications tag 116, and in particular, to the logic circuit 120 for processing. The logic circuit 120, having received the electric signal from the piezoelectric element 144, may update the opening indicator 136. For example, the opening indicator 136 may be updated from a value of "0" to a value of "1", for example in a binary flag that the item 108 has been opened, or as a counter of the number of times the item 108 has been opened. In some examples, the logic circuit 120 may additionally identify and store metadata, for example indicating a date/time value of receipt of the electric signal.

Subsequently, if the item 108 is closed and the portions 112 are mated again, the piezoelectric element 144 disposed between the two portions 112 may be re-loaded. Upon a subsequent opening of the item 108, the piezoelectric element 144 is again unloaded, generating a further electric signal 200 which is sent to the wireless communications tag 116. The logic circuit 120 may maintain the opening indicator 136 at a value of "1", if the opening indicator 136 is a binary flag (i.e., to process the electric signal 200, the logic circuit 120 may simply set the opening indicator 136 to the value of "1"). Alternately, the logic circuit 120 may update the opening indicator 136 to a value of "2", if the opening indicator 136 is a counter (i.e., to process the electric signal 400, the logic circuit 120 may increment the opening indicator 136). Note that if the portions 112 are mated again, thereby closing item 108 and re-loading piezoelectric element 144, the piezoelectric element 144 may not be configured to output an electric signal. Correspondingly, the opening indicator 136 may not change when item 108 is closed. Alternatively, if the portions 112 are mated again, thereby closing item 108 and re-loading piezoelectric element 144, the piezoelectric element 144 may output an electric signal but the logic circuit 120 may be configured to not update the opening indicator 136. The opening indicator 136 may correspondingly not change in this embodiment either. In alternate embodiments, if the portions 112 are mated again, thereby closing item 108 and re-loading piezoelectric element 144, the piezoelectric element 144 may output an electric signal and the logic circuit 120 may be configured to update a closing indicator in the memory 124, in a similar way the opening indicator 136 is updated. Further, in some examples, the memory 124 may additionally store metadata associated with the closing indicator, such as a date and/or time of update and/or closing occurrence(s) or the like. It is understood that in order for item 108 to be re-opened, it must be closed first.

In some examples, the wireless communications tag 116 may be a radio frequency (RF) tag (e.g., such as an RFID tag or an NFC tag) as illustrated in FIG. 4 The tag 116 may include the energy harvester 130, a demodulator 412, a decoder 416, a modulator 420, and an encoder 424. In operation, when the RFID tag 116 is within a read range of an RFID reader or interrogator, such as the reader 140, radio waves of the far-field radio frequency communication emitted by the RFID reader can generate a time varying electromagnetic field, which in turn can induce, via inductive coupling, an electrical signal (e.g., an electric current) in the antenna 128. The electrical signal can be processed by the energy harvester 130 to generate a power supply voltage to power the components of the RFID tag 116. For example, the energy harvester 130 receives the electrical signal and converts the electrical signal to a direct current voltage. The energy harvester 130 can include, for example, a charge pump, voltage converter, voltage regulator, and/or other circuitry. The electrical signal can also include information that can be demodulated by the demodulator 412 and decoded by the decoder 416. The decoded electrical signal can be received as an input by the logic circuit 120 from the decoder 416.

In response to receipt of the decoded electrical signal and when sufficient power is generated from the induced electrical current, the logic circuit 120 can retrieve data from the memory 124 (e.g., the identifier 132 and/or the opening indicator 136) and output the data to the encoder 424. The logic circuit 120 can include software, firmware, and/or hardware, or any combination thereof to facilitate the operations performed by the logic circuit 120. For example, the logic circuit 120 can include digital circuitry, such as logic gates. The encoder 424 can encode the data from the logic circuit 120 and output the encoded data to the modulator 420, which can modulate the encoded data and output the modulated data to be transmitted by the antenna 128 to a corresponding RFID circuit of the reader 140. The electric signal generated by the unloading of the piezoelectric elements 408 may similarly generate sufficient energy to energize the logic circuit 120 to perform the update operation on the opening indicator 136. This update operation is also known as writing to the RFID tag 116.

Referring again to FIGS. 1 and 2, the reader 140 may be a dedicated reader, for example implemented at a point-of-sale terminal or the like, while in other examples, the reader 140 may be a fixed overhead RFID reader, for example to facilitate inventory tracking within a retail or storage facility or the like. In other examples, the reader 140 may be a handheld RFID or NFC reader used by a person to interrogate tags, and in other examples, the reader may be a portal RFID or NFC reader located at transition points in a venue, such as entry/exit doors or doors between different sections of the venue. In yet other examples, the reader 140 may be a mobile fixed RFID or NFC reader, such as a reader fixed to a moving object, such as a cart or a vehicle, such as a forklift or truck.

Figure 3:
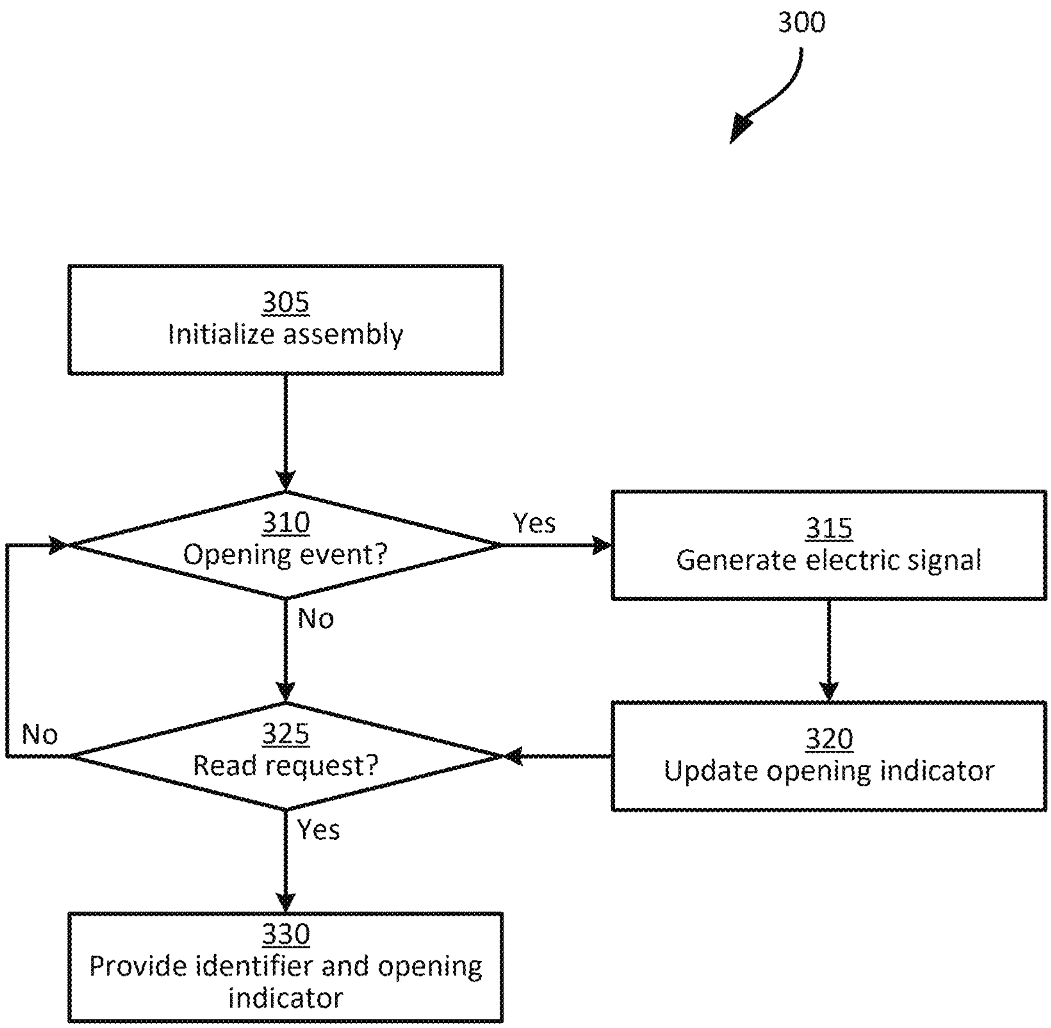
FIG. 3 is a flowchart of a method for detecting opening events of an item.

Turning now to FIG. 3, a flowchart of a method 300 of tracking opening occurrences is illustrated. The method 300 will be discussed in conjunction with its performance in the system 100, and particularly by the assembly 104. An embodiment of the system 100 can utilize the tag illustrated in FIG. 4 such that the tag forms the assembly 104. In other examples, the method 300 may be performed by other suitable devices or systems.

At block 305, the assembly 104 is initialized. In particular, the assembly 104 is applied to the item 108 with the piezoelectric element 144 disposed between the two portions 112 when the two portions 112 are mated to load the piezoelectric element 144. At initialization of the assembly 104, the opening indicator 136 may be set or reset to indicate that no opening occurrences have occurred.

At block 310, the assembly 104 determines whether an opening event has been detected, based on the unloading of the piezoelectric element 144 and any electric signal generated from the piezoelectric element 144.

If the determination at block 310 is affirmative, that is an opening event has been detected, then the assembly 104 proceeds to block 315. At block 315, the piezoelectric element 144 is unloaded by the unmating of the two portions 112 and accordingly may generate an electric signal (i.e., via the piezoelectric effect of the piezoelectric element 144) and output the electric signal which can be used by the wireless communications tag 116. In examples where the wireless communications tag 116 is based on an RFID or NFC communications protocol, the electric signal may provide sufficient energy to energize the components of the wireless communications tag 116, and in particular the logic circuit 120, to process the electric signal. As described herein, the electrical signal may provide sufficient energy for the wireless communication tag 116 to transmit a RF signal via the antenna.

At block 320, the logic circuit 120 is configured to update the opening indicator 136 to indicate an opening occurrence of the item 108 and/or to transmit the opening indicator for receipt by another device, e.g., the reader 140. For example, the logic circuit 120 may set the opening indicator 136 to a binary value indicating that the item 108 has been opened at least once. Alternately, the logic circuit 120 may increment the opening indicator 136 to increase a counter of the number of times the item 108 has been opened.

If the determination at block 310 is negative, or after performance of block 320, the assembly 104 proceeds to block 325. At block 325, the assembly 104 determines whether a read request has been received at the wireless communications tag 116. For example, the assembly 104 may make an affirmative determination at block 325 in response to an interrogation by a reader 140 (e.g., an RFID and/or NFC reader) or another suitable read request by another reader 140 (e.g., an RFID and/or NFC reader) or the like.

If the determination at block 325 is negative, then the assembly 104 returns to iterate through blocks 310 to continue to monitor for opening occurrences (i.e., via unloading of the piezoelectric element 144) and subsequently block 325 to monitor for read requests.

If the determination at block 325 is affirmative, then the assembly 104 proceeds to block 330. At block 330, the assembly provides the identifier 132 (e.g., an EPC) and the opening indicator 136 to the reader 140 from which the read request was received at block 325. In some embodiments, the opening indicator 136 may be a field in the identifier 132 (e.g., an EPC) such that whenever the assembly 104 provides the identifier 132 as the wireless communications tag 116 is read, by recognizing the opening indicator 136 in the identifier 132 it will be quickly determined whether the item 108 has been opened. Furthermore, when interrogating a group of wireless communications tags, the EPCs that are read and collected can be filtered to isolate those with opening indicators that indicate the items they are associated with have been opened at least once.

For example, the read request at block 325 may be a scanning or interrogating operation by a reader 140 at a point-of-sale terminal within a retail facility, for example upon sale or return of the item 108. When the wireless communications tag 116 is scanned or interrogated by the reader 140, the wireless communications tag 116 may transmit both the identifier 132 (i.e., to provide the EPC to process the sale or return) and the value of the opening indicator 136 to the reader 140. In particular, the wireless communications tag may use the RF wave from the interrogation by the reader 140 to generate power and facilitate transmitting the value to the reader 140. In some examples, the opening indicator 136 may simply be provided to an operator of the reader 140, while in other examples, the reader 140 (or an associated computing device) may provide a notification or a flag (e.g., an audio and/or visual notification) if the opening indicator 136 indicates that the item 108 has been opened at least once. The real-time identification of opening occurrences at the time of sale or return may prompt the retailer to investigate the item 108 further prior to completing the transaction, to reduce theft or improper transactions in real time. For example, a retailer may not accept an item 108 for return that has been opened. This may prevent someone from purchasing a working item and returning in its place a pre-owned damaged or defective item (i.e. return fraud). It may also prevent someone from "bricking" an electronic item 108, which is when a functional electronic item is purchased, stripped of all its valuable components, and then returned. The perpetrator may try to conceal that the package was opened by making it look like it was not from the outside, but when the identifier 132 and opening indicator 136 are provided at block 330 during the attempted return, the retailer may determine that the item 108 was indeed opened and is therefore not eligible to be returned. This may then even prompt the retailer to open the package to find the compromised contents even though there may have been no visual indication that this was necessary.

In a further embodiment, the read request at block 325 may be from a fixed overhead real time inventory system reader 140 over the sales floor of a retail facility or from a portal reader 140 in a retail facility. To help detect product-switching as it happens prior to the opportunity to detect this later during the sales transaction at a point-of-sale terminal, at block 330, the identifier 132 and opening indicator 136 may be provided to such a reader within a read range of a high value item as it is being opened on the sales floor prior to transferring the goods to another package. The high value item's opening indicator 136 will be updated real time as the item is opened, and as soon as the item's wireless communications tag 116 is read, the loss prevention staff at the retail facility may be notified, directing them to this area of the store, and the associated security camera footage may be saved. These events may take place well in advance of any point-of-sale activity, giving the staff even more time to react and respond to the situation.

In other examples, the read request at block 325 may be performed to track inventory and detect potential tampering of inventory and/or food and drink or other consumable items, for example when inventory is initially received and/or loaded or unloaded, and/or by fixed RFID readers used for tracking inventory within the retail or storage facility, or the like. For example, when a retailer receives in pallets of goods, the entire shipment may receive a read request at block 325 from readers 140 as part of the retailer's inventory tracking system. As a result, in addition to keeping an accurate inventory count, per block 330, any individual items 108 that have been opened, and potentially tampered with, will be identified even if they may be visually hidden amongst all the items in the delivery. In some examples, when the opening indicator 136 is a field in the identifier 132 (e.g., an EPC), the reader 140 may apply a mask or the like to this field to specifically identify items having an opening indicator 136 which indicates at least one opening occurrence. In this example, the application of a mask or the like ensures the reader 140 only reads wireless communications tags affixed to items that have been opened, and all other wireless communications tags are ignored. This allows for the creation of a list of opened items which may be further investigated. That is, the wireless communications tag 116 or an identifier for the item 108 (e.g., the associated EPC for the tag 116 assigned to the item 108) may be added to the list when the value of the opening indicator indicates that the item has been opened at least once.

In still further examples, the read request at block 325 may be performed to identify the number of times the item 108 has been opened, for example to track medication dosages and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An assembly for detecting opening events of an item, the assembly comprising:

a wireless communications tag comprising: a logic circuit and a memory configured to store an opening indicator; and a piezoelectric element operatively coupled to the logic circuit, the piezoelectric element is configured to be disposed between two mating portions of a closing structure of the item;

wherein the piezoelectric element is loaded when the two portions are mated and unloaded when the two portions of the closing structure are unmated; and wherein the piezoelectric element is configured to output an electric signal to cause the logic circuit to update the opening indicator when the piezoelectric element is unloaded.

2. The assembly of claim 1, wherein the piezoelectric element is integrated into a body of the wireless communications tag.

3. The assembly of claim 1, wherein the opening indicator comprises a binary flag, and wherein the logic circuit is configured to set the opening indicator to indicate that the item has been opened in response to the electric signal.

4. The assembly of claim 1, wherein the opening indicator comprises a counter, and wherein the logic circuit is configured to increment the opening indicator to count a number of times the item has been opened in response to the electric signal.

5. The assembly of claim 1, wherein the memory stores an electronic product code, and wherein the opening indicator is a field within the electronic product code.

6. The assembly of claim 1, wherein the wireless communications tag comprises at least one of a radio-frequency identification tag or a near-field communication tag.

7. The assembly of claim 6, wherein the wireless communications tag is configured to be energized by the electric signal to allow the logic circuit to update the opening indicator stored in the memory.

8. The assembly of claim 1, wherein the wireless communications tag is configured to provide the opening indicator to a reader in response to a read request from the reader.

9. A method comprising:

initializing an assembly for detecting opening events of an item by disposing a piezoelectric element of the assembly between two mating portions of a closing structure of the item to load the piezoelectric element;

generating and outputting, by the piezoelectric element, an electric signal in response to unloading the piezoelectric element by unmating the two portions of the closing structure; and updating an opening indicator stored in the wireless communications tag in response to the generating and outputting of the electric signal by the piezoelectric element.

10. The method of claim 9, wherein initializing the assembly further comprises setting the opening indicator to indicate the item has not been opened.

11. The method of claim 9, wherein the opening indicator comprises a binary flag, and wherein updating the opening indicator comprises setting the opening indicator to indicate the item has been opened in response to the electric signal.

12. The method of claim 9 wherein the opening indicator comprises a counter, and wherein updating the opening indicator comprises incrementing the opening indicator to count a number of times the item has been opened in response to the electric signal.

13. The method of claim 9, further comprising:

storing an electronic product code in the wireless communications tag, wherein the opening indicator is a field within the electronic product code.

14. The method of claim 9, wherein the wireless communications tag comprises at least one of a radio-frequency identification tag or a near-field communication tag.

15. The method of claim 14, further comprising energizing, using the electric signal, the wireless communications tag to allow the wireless communications tag to update the opening indicator.

16. The method of claim 9, further comprising transmitting the opening indicator from the wireless communications tag to a reader in response to a read request from the reader.

17. A system comprising:

a wireless communications tag, the wireless communications tag being affixed to an item, the wireless communications tag including or being operatively coupled to a piezoelectric element disposed between two mating portions of a closing structure of the item, the wireless communications tag configured to store an opening indicator based on an electrical signal output by the piezoelectric element, the opening indicator indicates whether the two mating portions were unmated or a number of times the two mating portions were unmated; and a reader configured to interrogate the wireless communications tag, wherein in response to interrogation of the wireless communications tag by the reader, the wireless communications tag transmits a value of the opening indicator to the reader.

18. The system of claim 17, wherein the wireless communications tag uses an electrical signal from the piezoelectric device to generate power and facilitate updating the value of the opening indicator and the wireless communications tag uses a radiofrequency wave from the interrogation by the reader to generate power and facilitate transmitting the value.

19. The system of claim 17, wherein the value of the opening indicator is stored in an opening identifier field in an electronic product code memory of the wireless communications tag.

20. The system of claim 19, wherein the reader applies a mask corresponding to the opening identifier field such that the reader (i) ignores the wireless communications tag when the value of the opening indicator indicates that the item has not been opened or (ii) adds the wireless communications tag or an identifier for the item to a list when the value of the opening indicator indicates that the item has been opened at least once.

21. The system of claim 17, wherein the reader generates a notification when the value of the opening indicator indicates that the item has been opened at least once.

* * * * *